No. 821,639. PATENTED MAY 29, 1906.
A. J. HART.
FIREMAN'S SIGNALING SYSTEM.
APPLICATION FILED DEC. 12, 1904.
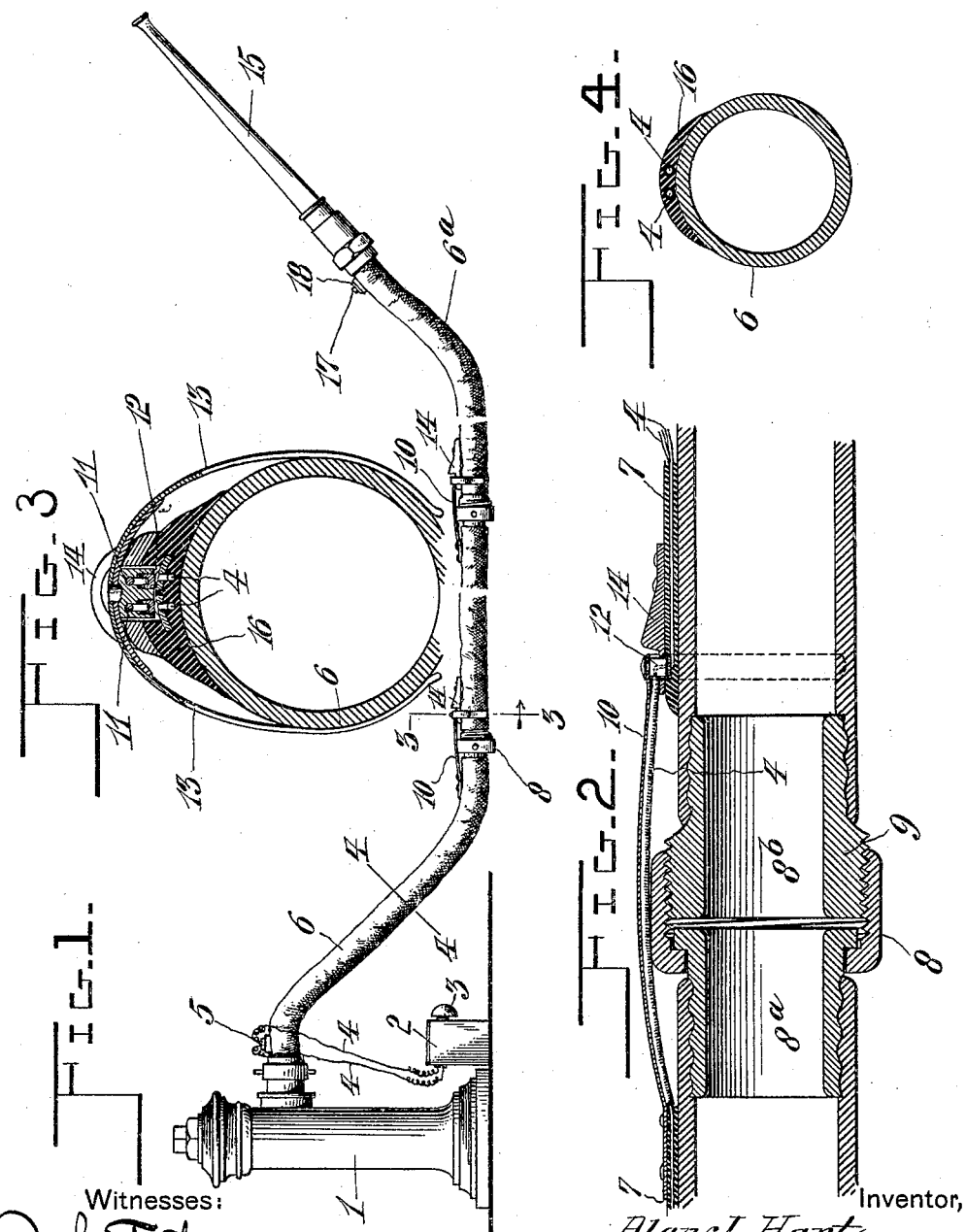
Witnesses:
Inventor,
Alan J. Hart,
By Marion & Marion
Attorneys

UNITED STATES PATENT OFFICE.

ALAN JUDAH HART, OF MONTREAL, CANADA.

FIREMAN'S SIGNALING SYSTEM.

No. 821,639.  Specification of Letters Patent.  Patented May 29, 1906.

Application filed December 12, 1904. Serial No. 236,488.

*To all whom it may concern:*

Be it known that I, ALAN JUDAH HART, a subject of the King of Great Britain, residing at Montreal, in the county of Hochelaga, Province of Quebec, Canada, have invented certain new and useful Improvements in Firemen's Signaling Systems; and I do hereby declare that the following is a full, clear, and exact description of the invention, such as will enable others skilled in the art to which it appertains to make and use the same.

This invention relates to new and useful improvements in signaling systems adapted to be used by firemen, and is connected with the ordinary fire-hose used for extinguishing fires.

The object of the invention is to provide suitable means whereby a fire-hose may be equipped with signal-wires which will be properly protected so as to avoid injury or destruction thereof and which will be utilized by a fireman in a remote part of the building or upon the building to convey an audible signal to his companions upon the ground.

Referring to the annexed drawings, in which similar numerals of reference indicate corresponding parts in all the views, Figure 1 illustrates a fire-plug to which a hose is attached, which hose is equipped with my improved signaling means, though the hose is broken at two places for convenience of illustration of a plurality of sections thereof. Fig. 2 is a longitudinal vertical section taken approximately through a coupling or joint between two sections of hose, illustrating the manner of spanning such coupling. Fig. 3 is an enlarged sectional view taken on line 3 3 of Fig. 1, and Fig. 4 is a sectional view taken on line 4 4 of Fig. 1.

Referring particularly to the drawings, 1 is a fire-plug or hydrant, which may be of any convenient construction.

2 is a box containing a battery and has attached thereto a signal-bell or other audible signal 3. Extending from the battery within the box 2 are signal-wires 4 4, which extend to a plug 5, suitably insulated for the passage of said wires, which plug 5 is connected with the short hose-sections 6. (Shown in the drawings.) Either woven within the cover or sheathing of the hose or connected thereto within a suitable sheathing 7 the wires 4 are conducted, said wires extending the entire length of each hose-section except for a short distance near the coupling-ring 8, commonly incident to fire-hose, which rings are adapted to engage the screw-threaded stems 9, projecting from adjacent hose-sections. Extending from each hose-section at one end is a foldable flap 10, (shown enlarged in Fig. 2,) within which flap 10 the wires 4 are carried, said wires being fully insulated and properly protected within said flap, so as to prevent short-circuiting, &c. The wires carried through the flaps 10 are connected with and terminate in pins or plugs 11, (shown in the enlarged detail in Fig. 3,) which pins or plugs enter and form contact with the socket members 12. (Shown in said figure.) Connected with the socket members 12 and extending longitudinally of each hose-section the wires 4 continue through and pass through in each instance one of said foldable flaps 10, while collars 13 are connected with said foldable flaps, as shown, the said collar 13 being of sufficient length to approximately embrace the hose-sections, so as to retain the movable ends of the flap 10 in position, and thereby secure the plugs 11 within their sections 12. For the purpose of protecting the movable end of the flap 10 the shoulders 14 are provided upon the seats within which said sections 12 are placed, the said shoulders 14 projecting sufficiently far radially from the hose to project beyond the upper extremity of the foldable flaps 10, so that if the hose is dragged in a direction from the fire-plug 1 to the nozzle 15 the shoulders 14 will serve as a protecting means and guard for the flaps 10, thereby preventing disengagement of the pins and sections 11 and 12.

It will be evident that for the major portion of the hose the wires 4 should be embedded within insulation 16, as shown in Figs. 3 and 4, which insulation may be covered by sheathing commonly incident to the hose construction or may consist of a suitable strip connected with the hose in any suitable manner. Upon one hose-section, as 6ª, in close proximity to the nozzle 15 a push-button 17 is seated in the socket 18 and is adapted by means of an ordinary spring-arm (commonly incident to push-button constructions and not shown for that reason) to close circuit between the two wires 4 4, thereby permitting the fireman to signal from the nozzle end to his companions upon the ground or at any remote point where the signal-box 2 may be located.

The operation of the device is as follows: Each hose-section being equipped with a plurality of wires which terminate in the foldable flaps 10 and are provided with the socket members 12 at opposite ends from the ends on which the flaps 10 are connected, it is evident that the hose-sections may be coupled in the usual manner, and when coupled the flaps 10 may be thrown into such position that the pins 11 will engage the sockets 12, thereby establishing a complete line of wiring from the plug 1 to nozzle 15, the spring-clips 13 serving to hold the flaps 10 in position upon the hose-sections, so as to prevent accidental displacement of the pins 11 from their sockets. When the hoseman desires to signal to his companions upon the ground, all that is necessary is to press upon the push-button 17 and by a predetermined code of signals convey the necessary information through the wires 4 to the signal 3. The flaps 10 are necessary in a system of this character to provide insulated means for carrying the wires 4 over the metallic connections commonly incident to fire-hose, said connections commonly comprising the ring 8, which is supported upon the sleeve 8ª, and by a screw-threaded connection engaging with the companion sleeve 8ᵇ, as shown in Fig. 2, as without the foldable flap 10 there would be no means of positively insuring an uninterrupted circuit when required.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

In a device of the character described, a plurality of hose-sections, insulated wires carried by each section, a flexible insulated member secured to one end of each hose-section and adapted to receive said wires, plugs on said wires adjacent the free end of each of said flexible insulated members, a contacting member carried by each of the hose-sections, a shoulder adjacent to each of said contacting members, a segmental spring-clip secured to each of said flexible members and adapted to engage the adjacent hose-section, a push-button at one end of said wires, an alarm at the other end thereof, and a source of electrical energy for said wires.

In witness whereof I have hereunto set my hand in the presence of two witnesses.

ALAN JUDAH HART.

Witnesses:
F. H. GIBBS,
M. McALEER.